United States Patent [19]
Alvarez, II et al.

[11] Patent Number: 5,692,135
[45] Date of Patent: Nov. 25, 1997

[54] METHOD AND SYSTEM FOR PERFORMING AN ASYMMETRIC BUS ARBITRATION PROTOCOL WITHIN A DATA PROCESSING SYSTEM

[75] Inventors: Manuel Joseph Alvarez, II, Austin; Gregory Alan Hughes, Round Rock; Jeffrey Thomas Kreulen, Austin; Audrey Davis Romonosky, Austin; Sanjay Raghunath Deshpande, Austin, all of Tex.

[73] Assignee: International Business Machines Corporation, Armonk, N.Y.

[21] Appl. No.: 572,320

[22] Filed: Dec. 14, 1995

[51] Int. Cl.⁶ .................................................. G06F 13/36
[52] U.S. Cl. .................. 395/287; 395/293; 395/728; 370/462
[58] Field of Search ......................... 395/293, 729, 395/287, 295, 728, 200.06, 297, 800, 298; 370/85.2, 462

[56] References Cited

U.S. PATENT DOCUMENTS

| | | | |
|---|---|---|---|
| 4,570,217 | 2/1986 | Allen et al. | 364/188 |
| 4,745,546 | 5/1988 | Grinberg et al. | 395/800 |
| 4,831,582 | 5/1989 | Miller et al. | 395/600 |
| 5,179,709 | 1/1993 | Bailey et al. | 395/843 |
| 5,239,651 | 8/1993 | Sodos | 395/729 |
| 5,355,496 | 10/1994 | Fant et al. | 395/700 |
| 5,377,332 | 12/1994 | Entwistle et al. | 395/297 |
| 5,379,444 | 1/1995 | Mumme | 395/800 |
| 5,416,910 | 5/1995 | Moyer et al. | 395/293 |
| 5,555,425 | 9/1996 | Zeller et al. | 395/800 |
| 5,564,062 | 10/1996 | Meaney et al. | 395/732 |

*Primary Examiner*—Gopal C. Ray
*Attorney, Agent, or Firm*—Richard A. Henkler; Andrew J. Dillon

[57] ABSTRACT

An arbitration protocol, preferably known as data-valid extended (DVE) protocol, for determining which one of the two units within a computer system may obtain access to a common bus is described. The DVE protocol is based on a point-to-point communication between two peer units. The DVE protocol is a physical level signalling convention for controlling switch communications on bi-directional address buses and data buses in a boundary-latched synchronous environment. The DVE protocol is asymmetric, yet fair, and is designed to minimize the number of cycles spent (or latency) in accessing the address or data buses and to maximize the number useful cycles (or bandwidth) on the address buses as well as the data buses. The asymmetry of the DVE protocol reduces the number of cycles spent in arbitration to zero for any data transfer size greater than one.

13 Claims, 5 Drawing Sheets

METHOD AND SYSTEM FOR PERFORMING AN ASYMMETRIC BUS ARBITRATION PROTOCOL WITHIN A DATA PROCESSING SYSTEM

BACKGROUND OF THE INVENTION

1. Technical Field

The present invention relates to a method and system for data processing in general, and in particular to a method for establishing bus priority between two units of a subsystem. Still more particularly, the present invention relates to a protocol for arbitrating bus access between two competing units of a subsystem, that share a common bi-directional bus.

2. Description of the Prior Art

When there are two competing units on a subsystem that share a common bi-directional bus, methods for arbitrating bus access, generally known as bus arbitration protocols, are typically utilized to reduce the arbitration overhead between these two units. In addition, bus arbitration protocols are often utilized in subsystems having multiple units to avoid bus contention. Bus arbitration protocols are also utilized to guarantee fairness for all the units within a subsystem that shares a common bus.

One example of a bus arbitration protocol is a protocol that decides which unit is sending and which unit is listening in a symmetrical fashion. In such a symmetrical protocol, three clock cycles are typically required. A first cycle is utilized for sending a request, a second cycle is utilized for arbitration, and a third cycle is utilized for responding to a proper selection.

Another example of a bus arbitration protocol is a protocol that utilizes a master-slave relationship in which one unit is a master and the other unit is a slave, such that the slave unit always makes requests for the bus while the master unit arbitrates whether it should grant bus access to the slave unit. Like the symmetrical protocol, the master-slave approach requires at least three clock cycles to perform arbitration and grant bus access to any unit.

Although both of the bus arbitration protocols mentioned above can perform their duties quite effectively, a three-clock cycle for bus arbitration is unacceptably high from an efficiency standpoint. Hence, several other improved bus arbitration protocols have been developed with the goal of reducing clock cycles; however, these improved protocols still require at least one null cycle between consecutive data transfers.

Consequently, it would be desirable to provide a bus arbitration protocol that yields 100% bus utilization, regardless of the size of the data transfer.

SUMMARY OF THE INVENTION

In view of the foregoing, it is therefore an object of the present invention to provide an improved method and system for data processing.

It is another object of the present invention to provide an improved method for establishing bus priority between two units of a subsystem.

It is yet another object of the present invention to provide an improved protocol for arbitrating bus access between two competing units of a subsystem, which share a common bi-directional bus to yield a full bus utilization regardless of the size of data transferred.

In accordance with the method and system of the present invention, an asymmetric bus arbitration protocol is provided as follows. Either one of two units within the computer system can initiate an address transaction by raising an A_Val signal. If it is a data transaction, the sending unit must also raise a D_Val signal at the same time as the A_Val signal. An address transaction can be initiated while the data bus is active for a data transaction. However, consecutive transactions initiated by either side must be separated by at least one idle A_Val cycle, called the fairness cycle. For a data transaction, the sending unit transmits the address in the cycle after lowering its A_Val signal and begins transmitting data in the cycle after sending the address. A Size signal is sent in the same cycle as the address. If the bus is busy, either side may reserve the bus by activating its A_Val signal and/or D_Val signal, and hold the signal(s) active until the cycle before the completion of the on-going data transaction.

For a data transaction, a rightside unit must yield the bus to a leftside unit if both units attempt to begin a data transaction in the same cycle. A rightside unit may continue to assert its A_Val and D_Val signals to reserve the bus. A rightside unit can proceed with an address transaction if the leftside unit raises its A_Val signal to initiate an address transaction in the same cycle as the rightside unit raises its A_Val signal. The rightside unit sends the address in the second cycle after raising its A_Val signal. To allow the required propagation of the A_Val and D_Val signals to the receiving unit's state machine, the rightside unit must hold A_Val and D_Val active for at least two cycles, except for back-to-back rightside data transactions. Contrarily, the leftside unit needs to hold these signals active only for one cycle.

All objects, features and advantages of the present invention will become apparent in the following detailed written description.

BRIEF DESCRIPTION OF THE DRAWINGS

The invention itself as well as a preferred mode of use, further objects and advantage thereof, will best be understood by reference to the following detailed description of an illustrative embodiment when read in conjunction with the accompanying drawings, wherein.

RELATED PATENT APPLICATION

The present application is related to a co-pending application U.S. Ser. No. 08/352,660 filed Dec. 9, 1994, entitled "ARBITRATION PROTOCOL FOR PEER-TO-PEER COMMUNICATION IN SYNCHRONOUS SYSTEMS"

(IBM Docket No. AT9-93-094), assigned to the assignee herein named, and is incorporated within hereto.

DETAILED DESCRIPTION OF PREFERRED EMBODIMENT

The present invention may be implemented in a variety of computers that utilize bi-directional buses for internal data communications. Such computer may be a stand-alone system or part of a network such as a local area network (LAN) or a wide area network (WAN).

Figure 1:
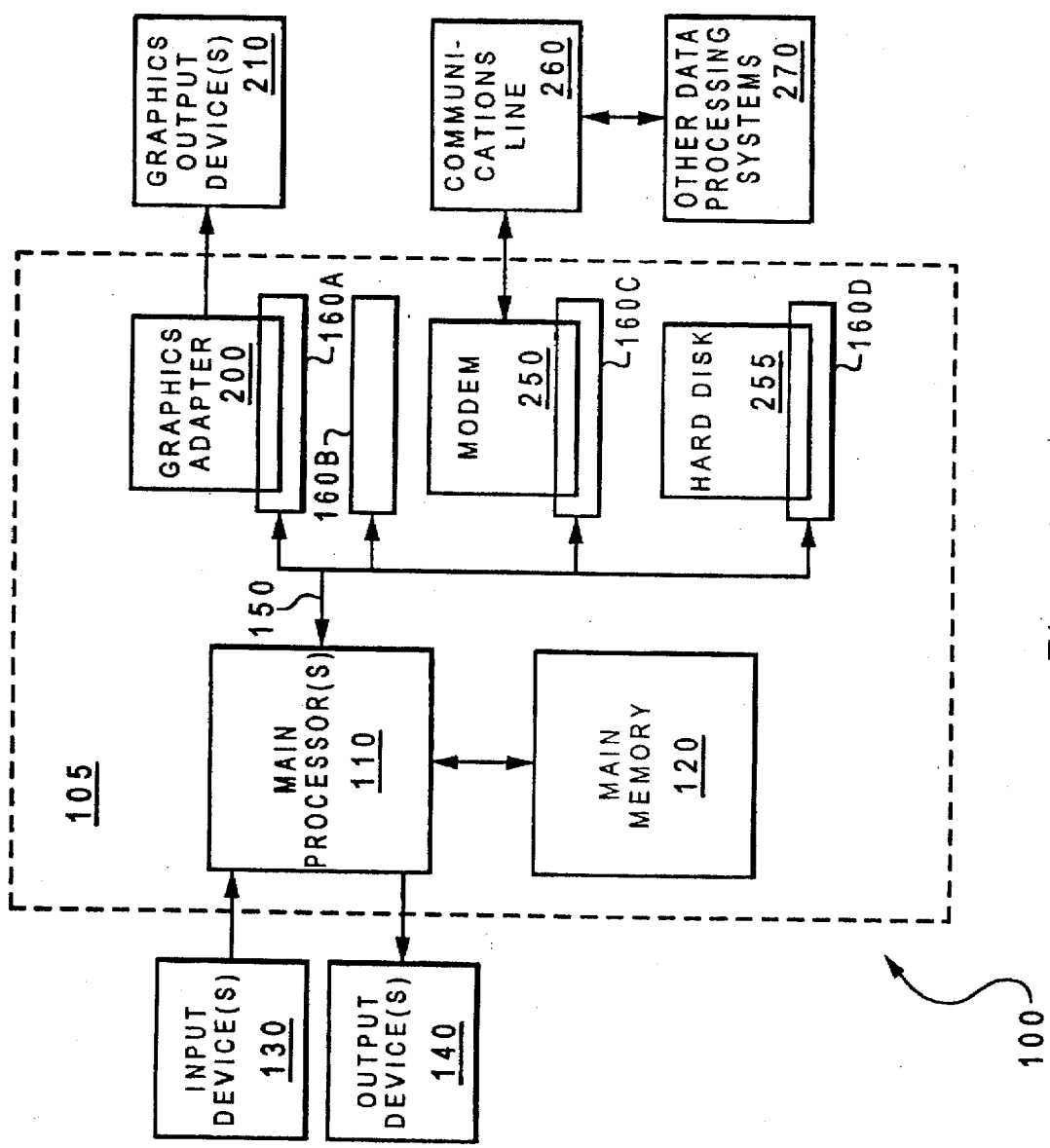
FIG. 1 is a block diagram of a typical digital computer which utilizes a preferred embodiment of the invention.

Referring now to the drawings and in particular to FIG. 1, there is depicted a block diagram of a typical digital computer 100. Digital computer 100 comprises main processor(s) 110 coupled to a main memory 120 in computer box 105 having input device(s) 130 and output device(s) 140 attached. Main processor(s) 110 may include a single processor or multiple processors. Input device(s) 130 may include a keyboard, mouse or other types of input device. Output device(s) 140 may include a monitor, plotter or other types of output device. Graphics adapter 200, modem 250 and hard disk 255 are located in adaptor slots 160A, 160C and 160D respectively to provide communications with main processor 110 via bus 150, while adaptor slot 160B remains open. Graphics adapter 200 receives instructions regarding graphics from main processor 110 on bus 150, thereby rendering the desired graphics output from the main processor to graphics output device(s) 210. Modem 250 may communicate with other data processing systems 270 across communications line 260.

Figure 2:
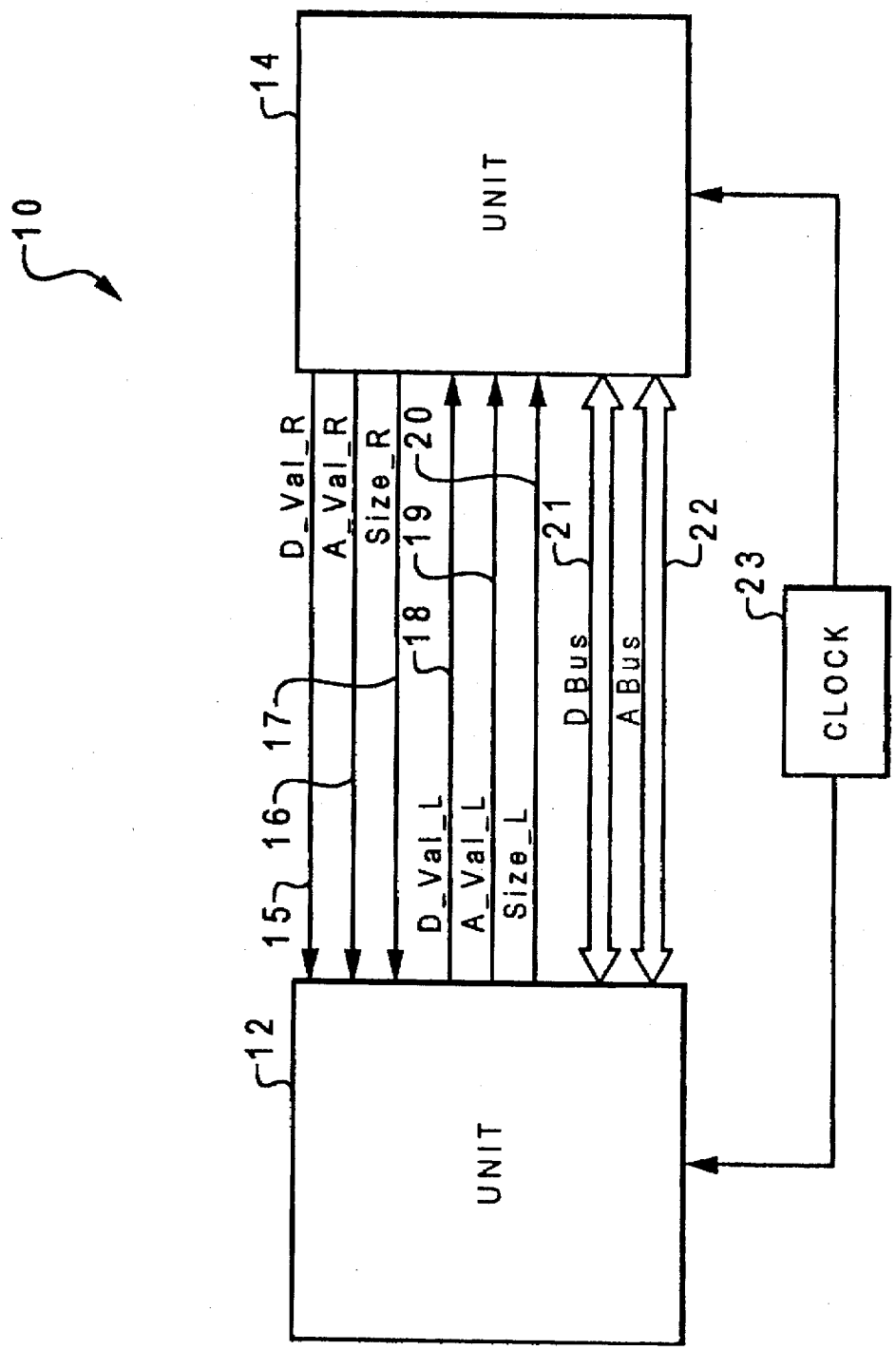
FIG. 2 is a block diagram of two peer-to-peer units for a subsystem within the digital computer of FIG. 1, which utilize a bus arbitration protocol according to a preferred embodiment of the invention.

Referring now to FIG. 2, there is illustrated a block diagram of a subsystem 10 within digital computer 100 of FIG. 1, which utilizes a preferred embodiment of the invention. System 10 comprises unit 12 and unit 14, both of which are fed by a centralized clock 23. Between unit 12 and unit 14, there are connected uni-directional control lines and bi-directional shared data paths (or buses). Control lines D_Val_L 18, A_Val_L 19 and Size_L 20 are for sending signals from unit 12 to unit 14, while control signals D_Val_R 15, A_Val_R 16 and Size_R 17 are for sending signals from unit 14 to unit 12. Shared data paths such as DBus 21 and ABus 22 allow signals to be transmitted both ways between unit 12 and unit 14.

In a preferred embodiment of the present invention, a bus arbitration protocol, preferably known as Data-Valid Extended (DVE) protocol, is a physical level signalling convention for controlling communications on bi-directional ABus 22 and DBus 21 in a boundary-latched synchronous environment. The DVE protocol is asymmetric, yet fair, designed to minimize the number of cycles spent (or latency) in accessing ABus 22 or DBus 21 and to maximize the number of useful cycles (or bandwidth) on ABus 22 as well as DBus 21. Due to its asymmetry, the DVE protocol fundamentally has a first side and a second side. This two-sidedness of the DVE protocol may also be illustrated in FIG. 2 as having a left side and a right side. For example, unit 12 on the left side may implement the left side of the DVE protocol, while unit 14 on the right side may implement the right side of the DVE protocol. This particular assignment is not mandatory because the most important aspect is that the two communicating units—unit 12 and unit 14—implement complementary sides of the DVE protocol.

The DVE protocol requires centralized clock 23 distributed to units 12 and 14 to be phase synchronous, although, perhaps, they may be separated by a well-controlled skew. All transfers of data or control information between unit 12 and unit 14 are assumed to take place on a per-clock-cycle basis. This single cycle is referred to as an interface cycle. Each signal line, as defined above, transfers at most a single bit of information during an interface cycle.

The DVE protocol is utilized by unit 12 and unit 14 to gain access to bi-directional ABus 22 and/or DBus 21. Once the access to DBus 21 is established, data may be transferred for a number of consecutive cycles. Such a contiguous transfer is referred to as a transaction. At the end of a transaction, the sending unit (either unit 12 or unit 14) may relinquish control of DBus 21 or try to acquire DBus 21 again if the sending unit wishes to make a consecutive transaction. Transmission of valid information during a single clock cycle is referred to as a slice.

The DVE protocol relies on the boundary latches (not shown) which allow maximum bus performance. Because the control lines are boundary-latched, each side sees the other side's control lines one cycle later, creating a control pipeline. Due to this control pipeline, contention on ABus 22 and DBus 21 may be controlled by the asymmetric left side and right side of the DVE protocol.

The DVE protocol supports the control of ABus 22 and DBus 21 preferably under two transaction formats, namely, address transaction (A-transaction) and address-and-data transaction (AD-transaction). In addition, preferably three uni-directional control signal lines are utilized to support the DVE protocol, namely, address valid (A_Val), data valid (D_Val), and data transaction size (size). As shown previously in FIG. 2, D_Val_L 18, A_Val_L 19 and size _L 20 of unit 12 are utilized to support the left side of the DVE protocol while D_Val_R 15, A_Val_R 16 and size _R 17 of unit 14 are utilized to support the right side of the DVE protocol.

An A-transaction is initiated when a sender unit (either unit 12 or unit 14) raises its A_Val, while an AD-transaction is initiated when the sender unit raises both of its A_Val and D_Val. The sender unit then drops these raised lines to begin a requested transaction. During a leftside A-transaction, a leftside AD-transaction or a rightside AD-transaction, the address becomes available at the same cycle when A_Val is dropped. During a rightside A-transaction, the address becomes available one cycle after A_Val is dropped. In addition, during an AD-transaction, the size information also becomes available when the address is available; however, data becomes available at the cycle after the address is available. An inactive A_Val represents a fairness cycle, and it must be posted between consecutive transactions on either side.

As a preferred embodiment of the invention, the rules of the DVE protocol can be summarized as follows:

Either side can initiate at most one transaction per cycle by raising its A_Val signal. If it is an AD-transaction, the sending side must raise its D_Val signal at the same time with its A_Val signal. Either side can initiate an A-transaction while the data bus is active for a data transaction.

For an AD-transaction, the sending side transmits the address in the cycle after lowering its A_Val signal, and begins transmitting data on the cycle after sending the address.

The Size signal is sent in the same cycle as the address.

If a request bus is busy, either side may reserve the bus by activating its A_Val signal and/or D_Val signal, and hold the signal(s) active until the cycle before the completion of the on-going transaction.

For an A-transaction, the right side of the DVE protocol must yield the data bus to the left side of the DVE protocol if both sides attempt to begin an AD-transaction in the same cycle. The right side may continue to assert its A_Val and D_Val signals to reserve the bus.

The right side of the DVE protocol can proceed with an A-transaction if the left side raises its A_Val signal to initiate an A-transaction in the same cycle as the right side raises its A_Val signal. The right side sends the address in the second cycle after raising its A_Val signal.

To allow the required propagation of the A_Val and D_Val signals to the receiving unit's state machine, the right side must hold A_Val and D_Val active for at least two cycles except for back-to-back rightside AD-transactions which utilize the extended D_Val protocol. The left side needs to hold these signals active for only one cycle.

Consecutive transactions initiated by either side must be separated by at least one idle A_Val cycle. This is referred to as the fairness cycle.

Figure 3:
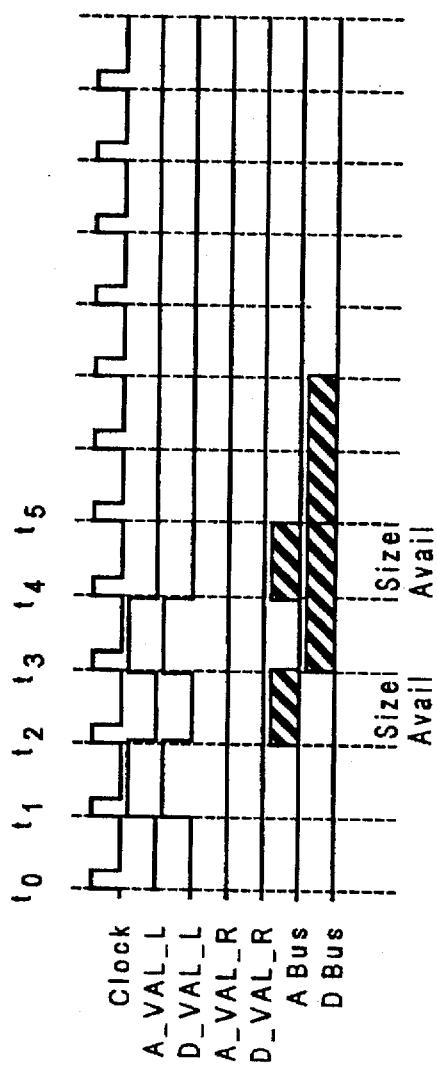
FIG. 3 is a timing diagram of a consecutive leftside data transaction according to a preferred embodiment of the invention.

Referring now to FIG. 3, there is illustrated a timing diagram of a consecutive leftside AD-transaction. Sender unit 12 first raises its A_Val_L 19 and D_Val_L 18 at $t_1$, and then checks for the status of A_Val_R 16 and D_Val_R 15 of sender unit 14 at a previous cycle $t_0$ (which is only available at this time). The previous cycle $t_0$ represents a leftside fairness cycle; thus, if A_Val_R 16 and D_Val_R 15 are asserted, then unit 14 wins and will take control of ABus 22 & DBus 21 as soon as all previous AD-transactions have completed. However, if A_Val_R 16 and D_Val_R 15 are inactive, as shown in FIG. 3, unit 12 wins and takes control of ABus 22 & DBus 21 as soon as all previous AD-transactions have completed. Hence, the address becomes available at $t_2$ and the data becomes available at $t_3$. In addition, the size information is also available when the address becomes available in $t_3$. The size information allows a pending sender unit to "predict" the cycle for dropping its control lines, which is the cycle before the completion of data transfer. As a preferred embodiment of the invention, all data transaction size is at least two cycles long.

At $t_3$, sender unit 12 raises its A_Val_L 19 and D_Val_L 18 again, and then checks for the status of A_Val_R 16 and D_Val_R 15 of sender unit 14 at $t_2$. Because unit 14 is not sending, unit 12 takes control of ABus 22 & DBus 21 as soon as the previous AD-transaction has completed, and the address becomes available at $t_4$ while the data becomes available at $t_5$. There is no gap between the two back-to-back leftside data transfers.

In the case of both unit 12 and unit 14 raising their respective A_Val_L 19 & D_Val_L 18 and A_Val_R 16 & D_Val_R 15 together, because of the control pipeline mentioned above, neither unit 12 or unit 14 will realize the situation until one cycle later. This is where the asymmetry comes in and the leftside (i.e. unit 12) wins in the case of an AD-transaction tie.

Similarly, for a leftside A-transaction, sender unit 12 first raises A_Val_L 19 and then checks for the status of A_Val_R 16 and D_Val_R 15 of sender unit 14 at a previous cycle (which is only available at this time). Because the previous cycle represents a leftside fairness cycle, if A_Val_R 16 is active or if a pending rightside AD-transaction is scheduled to go, unit 12 cannot take ABus 22. Otherwise, unit 12 takes control of ABus 22 as soon as all previous transactions have completed.

Figure 4:
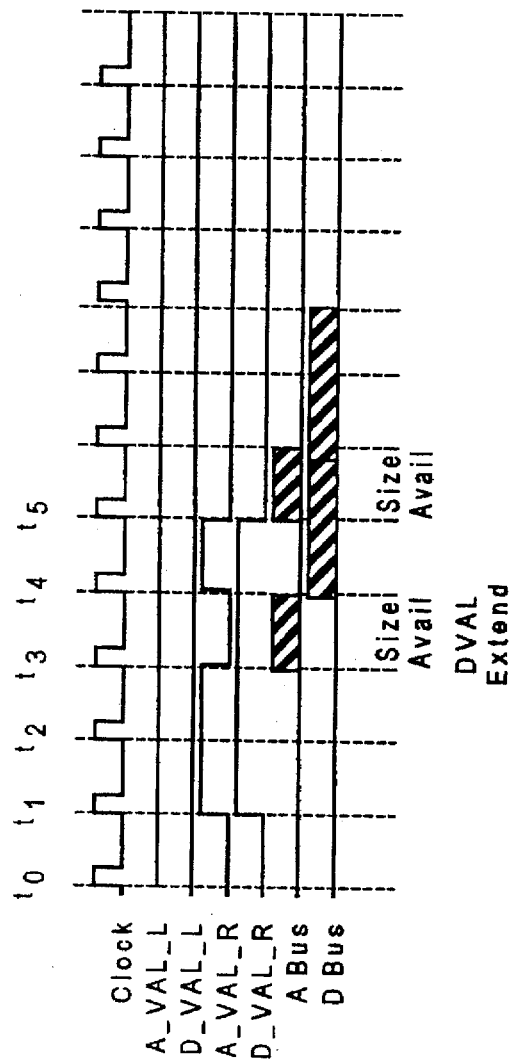
FIG. 4 is a timing diagram of a consecutive rightside data transaction according to a preferred embodiment of the invention.

Referring now to FIG. 4, there is illustrated a timing diagram of a consecutive rightside AD-transaction. Sender unit 14 first raises A_Val_R 16 and D_Val_R 15 at $t_1$. Because the rightside (i.e. unit 14) loses in any AD-transaction tie, this cycle represents a rightside fairness cycle. On a second cycle $t_2$ of active A_Val_R 16 and D_Val_R 15, unit 14 then checks the status of A_Val_L 19 and D_Val_L 18 of sender unit 12 at a previous cycle $t_1$ (which is only available at this time). The previous cycle $t_1$ represents a rightside fairness cycle; thus, if A_Val_L 19 and D_Val_L 18 are active, unit 12 wins and will take control of ABus 22 and DBus 21 as soon as all previous AD-transactions have completed. However, if A_Val_L 19 and D_Val_L 18 are inactive, as shown in FIG. 4, unit 14 wins and takes control of ABus 22 and DBus 21 as soon as all previous AD-transactions have completed. Hence, the address becomes available at $t_3$ and the data becomes available at $t_4$.

At $t_4$, sender unit 14 raises its A_Val_R 16 again, and then checks for the status of A_Val_L 19 and D_Val_L 18 of sender unit 12 at $t_3$. Although A_Val_R 16 is lowered at $t_3$, because this is a rightside fairness cycle, it is also considered as a valid first cycle for A_Val_R. This is preferably referred to as a DVal Extended cycle for which the name of this invention is coined. And because unit 12 is not sending, unit 14 takes control of ABus 22 & DBus 21 as soon as the previous AD-transaction has completed, and the address becomes available at $t_5$ while the data becomes available at $t_6$. As in leftside, there is no gap between the two back-to-back rightside data transfers.

The D_Val Extended cycle solves the problems with rightside back-to-back AD transfers that occur because a rightside AD sender unit needs to post its intentions for two cycles (due to losing in an AD tie) and post a fairness cycle between transactions. This would add a one-cycle gap for rightside back-to-back transactions with a size of less than three. The solution, as shown in FIG. 4, is to drop the A_Val_R at $t_3$ to start an AD-transaction while holding the D_Val_R active to indicate a back-to-back AD-transaction request. At $t_4$, A_Val_R is brought active along with the D_Val_R and the status of the leftside sender's A_Val_L and D_Val_L is checked. In this way, the D_Val-only cycle represents a rightside fairness cycle as well as the first right AD posting cycle.

Similarly, for a rightside A-transaction, sender unit 14 first raises A_Val_R 16. Because of the asymmetry of an address becoming active one cycle after A_Val_R 16 is dropped, both leftside and rightside A-transactions can proceed in an A-transaction tie. Only if a pending leftside AD-transaction is scheduled to go, unit 14 cannot take Abus 22, as mentioned previously.

Figure 5:
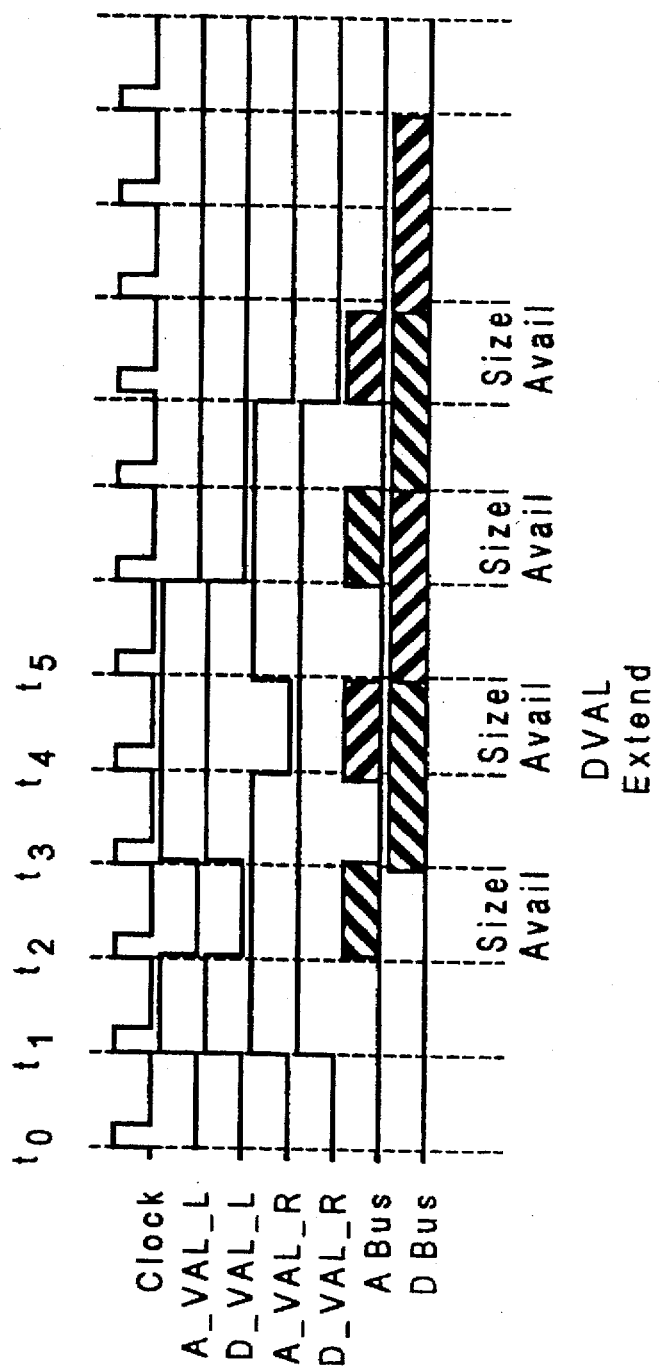
FIG. 5 is a timing diagram of a consecutive leftside-rightside-leftside-rightside data transaction according to a preferred embodiment of the invention.

Referring now to FIG. 5, there is illustrated a timing diagram of a consecutive leftside-rightside-leftside-rightside AD-transaction. As shown, again there is no gap between all data transfers.

Figure 6A:
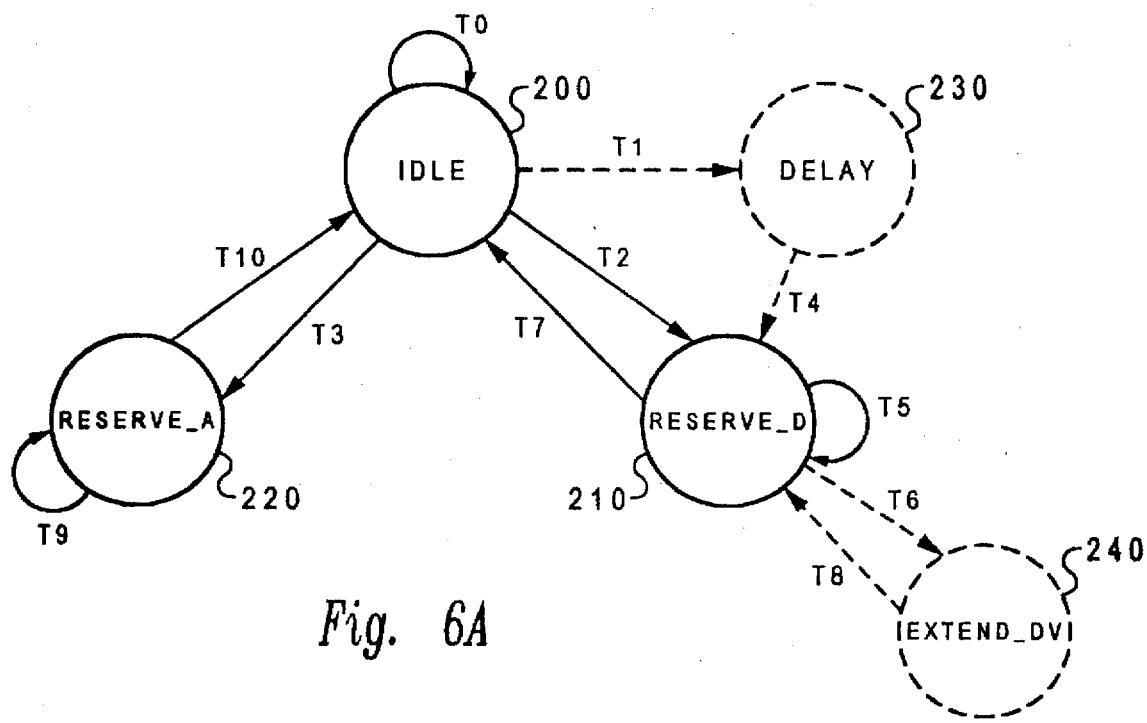
FIGS. 6A and 6B are state transition diagrams respectively illustrating a sender unit and a receiver unit according to a preferred embodiment of the invention.

Referring now to FIG. 6A, there is illustrated a state transition diagram of a sender unit according to a preferred embodiment of the invention. As shown in FIG. 6A, there are preferably five states in the sender unit. The solid line indicates the states that are for either leftside unit or rightside unit, while the dash line indicates the states that are for the rightside unit only. In state IDLE 200, the sender unit is ready to send data. When there is an upcoming data transfer from the rightside, the sender unit proceeds to state DELAY 230 via T1 for the pending rightside AD-transaction. However, when there is an upcoming data transfer from the leftside, the sender unit proceeds from state IDLE 200 via T2 to state RESERVE_D 210 for the pending leftside AD-transaction. The leftside sender unit can remain in state RESERVE_D 210 via T5, or proceeds back to state IDLE 200 via T7 the cycle before the completion of the rightside data transfer. The rightside sender unit can remain in state RESERVE_D 210 via T5, or proceeds back to state IDLE 200 via T7 the cycle before the completion of the leftside data transfer. From state RESERVE_D 210, the rightside sender unit can proceed to state EXTEND DV 240 via T6 for a back-to-back transaction, and returns to RESERVE_D via T8 the cycle before the completion of the on-going AD-transaction.

From state IDLE 200, the sender unit can proceed to state RESERVE_A 220 via T3 for pending leftside or rightside A-transaction. The leftside sender unit can remain in state RESERVE_A 220 via T9, or proceeds to state IDLE 200 via T3 the cycle before the completion of the rightside address transfer. The rightside sender unit can remain in state RESERVE_A 220 via T9, or proceeds to state IDLE 200 the cycle before the completion of the leftside address transfer.

Figure 6B:
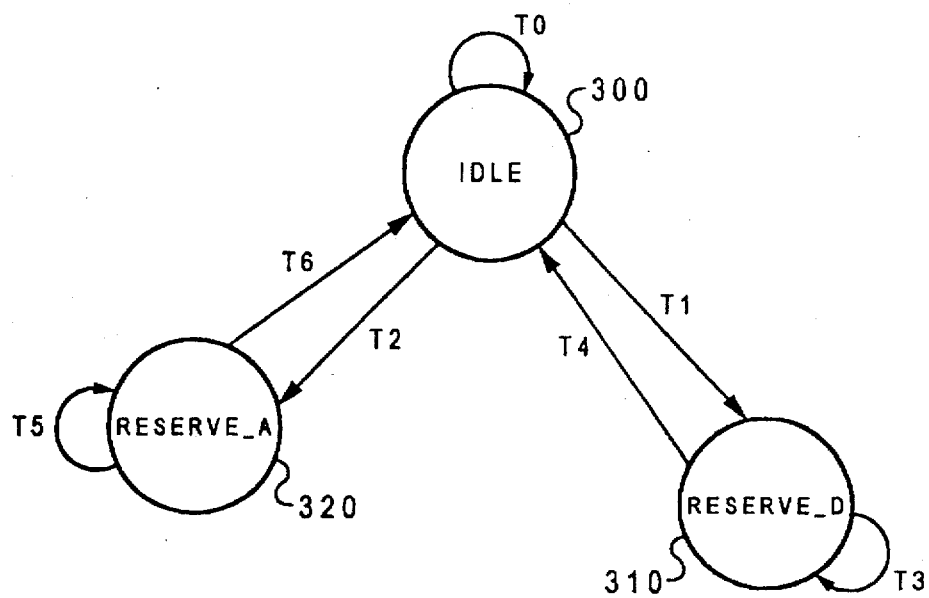

Referring now to FIG. 6B, there is illustrated a state transition diagram of the receiver unit in a preferred embodiment of the invention. As shown in FIG. 6B, there are preferably three states in the receiver unit. In state IDLE 300, the receiver unit is ready to receive data. The receiver unit remains in state IDLE 300 when it is ready to receive data. When both A_Val and D_Val are asserted for an AD-transaction, the receiver unit proceeds to state RESERVE_D 310 via T1. The receiver unit remains in state RESERVE_D 310 via T3 if A_Val is asserted, and proceeds back to state IDLE 300 via T4 if A_Val is negated. From state IDLE 300, the receiver unit can proceed to state RESERVE_A 320 via T2 when A_Val is asserted while D_Val is negated for an A-transaction. The receiver unit remains in state RESERVE_A 320 via T5 if A_Val stays asserted and returns to state IDLE 300 when A_Val is negated.

As has been described, arbitration protocol, the present invention provides a bus arbitration protocol, preferably referred to as DVE protocol, having an increased bandwidth and a decreased latency. Data transaction size information along with the D_Val Extended cycle have been added. The data transaction size information, which is available to the sender unit and the receiver unit on the cycle when A_Val is dropped, allows pending AD-transaction on either the original sender or receiver to anticipate the availability of the DBus, such that the AD-transaction can be started in a seamless way on the DBus. This results in no bandwidth loss on back-to-back transfers on either the same side or different sides for a data transaction size that is greater than one. However, because of the fairness cycle required between consecutive transactions on one side and the control pipeline between sides, back-to-back transfers of data transaction size of one will result in one cycle gap on the DBus.

While the invention has been particularly shown and described with reference to a preferred embodiment, it will be understood by those skilled in the art that various changes in form and detail may be made therein without departing from the spirit and scope of the invention.

What is claimed is:

1. A method for arbitrating an access to a data bus between a first unit and a second unit of a subsystem within a computer system, wherein each of said units has at least one control signal and a size signal, said method comprising:

asserting said at least one control signal by one of said units to initiate a first data transaction;

granting access to said data bus to whichever one of said units asserts said at least one control signal first;

transmitting a data size of said first data transaction via said size signal;

reserving said data bus for a second data transaction by another one of said units when said data bus is occupied by said first data transaction, wherein the length of said reservation is determined in response to said size signal for said data transaction; and granting access to said data bus to another one of said units as soon as said first data transaction is completed such that no gap exists on said data bus for any back-to-back data transaction having a data size greater than one.

2. The method for arbitrating an access to a data bus between a first unit and a second unit of a subsystem within a computer system in claim 1, wherein said asserting step is at least one cycle in order to initiate said first data transaction by one of said units designated as a leftside unit.

3. The method for arbitrating an access to a data bus between a first unit and a second unit of a subsystem within a computer system in claim 1, wherein said asserting step is at least two cycles in order to initiate said first data transaction by one of said units designated as a rightside unit.

4. The method for arbitrating an access to a data bus between a first unit and a second unit of a subsystem within a computer system in claim 1, wherein said asserting step initiated consecutively by a same one of said units is separated by at least one idle cycle on said at least one control signal assertion.

5. The method for arbitrating an access to a data bus between a first unit and a second unit of a subsystem within a computer system in claim 1, wherein said reserving step is by asserting and holding said at least one control signal active until the cycle before the completion of said first data transaction.

6. A method for arbitrating an access to a bus between a first unit and a second unit of a subsystem within a computer system, wherein each of said units has at least one control signal and a size signal, said method comprising:

asserting said at least one control signal of said first unit for at least one cycle to initiate a leftside transaction;

asserting said at least one control signal of said second unit for at least two cycles to initiate a rightside transaction;

granting access to said bus to one of said units which asserts its said at least one control signal first, if there is an assertion of control signals from both of said units in a different cycle;

granting access to said data bus to one of said units designated as a leftside unit, if there is an assertion of control signals from both of said units in a same cycle;

transmitting a data size of a data transaction via said size signal, wherein said data transaction can be either said leftside transaction or said rightside transaction;

separating consecutive assertions initiated by a same one of said units by at least one idle cycle on said at least one control signal assertion; and reserving said bus, when said bus is occupied by said data transaction, by activating and holding said at least one control signal active until the cycle before the completion of said data transaction, wherein the length of said holding is determined by said size signal of said data transaction.

7. The method for arbitrating an access to a bus between a first unit and a second unit of a subsystem within a computer system in claim 6, wherein said asserting step includes asserting one of said at least one control signal for transmitting an address.

8. The method for arbitrating an access to a bus between a first unit and a second unit of a subsystem within a computer system in claim 6, wherein said asserting step includes asserting two of said at least one control signal for transmitting data.

9. The method for arbitrating an access to a bus between a first unit and a second unit of a subsystem within a computer system in claim 6, wherein said asserting step for initiating a rightside transaction includes negating one of two said at least one control signal in a first cycle of said at least two cycles for a consecutive rightside transaction.

10. A computer system having a protocol for arbitrating an access to a data bus between a first unit and a second unit of a subsystem, wherein each of said units has at least one control signal and a size signal, said computer system comprising:

means for asserting said at least one control signal of said first unit for at least one cycle to initiate a leftside transaction;

means for asserting said at least one control signal of said second unit for at least two cycles to initiate a rightside transaction;

means for granting access to said bus to one of said units which asserts its said at least one control signal first, if there is an assertion of control signals from both of said units in a different cycle;

means for granting access to said data bus to one of said units designated as a leftside unit, if there is an assertion of control signals from both of said units in a same cycle;

means for transmitting a data size of a data transaction via said size signal, wherein said data transaction can be either said leftside transaction or said rightside transaction;

means for separating consecutive assertions initiated by a same one of said units by at least one idle cycle on said at least one control signal assertion; and means for reserving said bus, when said bus is occupied by said data transaction, by activating and holding said at least one control signal active until the cycle before the completion of said data transaction, wherein the length of said holding is determined by said size signal of said data transaction.

11. The computer system having a protocol for arbitrating an access to a data bus between a first unit and a second unit of a subsystem in claim 10, wherein said asserting means includes means for asserting one of said at least one control signal for transmitting an address.

12. The computer system having a protocol for arbitrating an access to a data bus between a first unit and a second unit of a subsystem in claim 10, wherein said asserting means includes means for asserting two of said at least one control signal for transmitting data.

13. The computer system having a protocol for arbitrating an access to a data bus between a first unit and a second unit of a subsystem in claim 10, wherein said asserting means for initiating a rightside transaction includes means for negating one of two said at least one control signal in a first cycle of said at least two cycles for a consecutive rightside transaction.

* * * * *